(12) United States Patent
Ebert et al.

(10) Patent No.: US 10,816,955 B2
(45) Date of Patent: Oct. 27, 2020

(54) PROCESS AND DEVICE FOR MANUFACTURING A DENTAL RESTORATION

(71) Applicant: Ivoclar Vivadent AG, Schaan (LI)

(72) Inventors: Jörg Ebert, Buchs (CH); Robert Grünenfelder, Eschen (LI); Tobias Specht, Ruggell (LI); Oliver Voigt, Trübbach (CH)

(73) Assignee: Ivoclar Vivadent AG, Schaan (LI)

( * ) Notice: Subject to any disclaimer, the term of this patent is extended or adjusted under 35 U.S.C. 154(b) by 791 days.

(21) Appl. No.: 14/732,547

(22) Filed: Jun. 5, 2015

(65) Prior Publication Data

US 2016/0089220 A1    Mar. 31, 2016

(30) Foreign Application Priority Data

Jun. 5, 2014 (EP) ..................................... 14171268

(51) Int. Cl.
*A61C 13/00* (2006.01)
*G05B 19/4097* (2006.01)
*A61C 13/083* (2006.01)
*A61C 5/77* (2017.01)

(52) U.S. Cl.
CPC ...... *G05B 19/4097* (2013.01); *A61C 13/0019* (2013.01); *A61C 13/083* (2013.01); *A61C 5/77* (2017.02); *A61C 13/0022* (2013.01); *G05B 2219/35134* (2013.01); *G05B 2219/45167* (2013.01)

(58) Field of Classification Search
CPC .............................. A61C 5/77; A61C 13/0004
See application file for complete search history.

(56) References Cited

U.S. PATENT DOCUMENTS 4,081,019 A * 3/1978 Kulig ........................ B22C 7/02
164/244
4,161,208 A * 7/1979 Cooper ..................... B22C 7/02
164/244
4,478,580 A * 10/1984 Barrut ...................... A61C 3/06
433/223

(Continued)

FOREIGN PATENT DOCUMENTS

WO          03/017864 A1     3/2003

*Primary Examiner* — Matthew J Daniels
*Assistant Examiner* — Andrew D Graham
(74) *Attorney, Agent, or Firm* — Hodgson Russ LLP

(57) ABSTRACT

Methods for manufacturing a dental restoration for a patient and dental ceramics production devices are disclosed. A dental restoration may be designed based on a scan of the patient's mouth, using a CAD software module. The software module may produce conveyor channels for a positive model based on the dimensions of a muffle in relation to the size and shape of the positive model. The conveyor channels may extend at an angle of between 0° and 130° away from an axis of the pressing channel, the axis being located essentially along an isotherm inside the muffle. A docking site may be selected based on a position with the greatest wall thickness of the positive model. The present disclosure allows the creation of a high-quality dental restoration in a very efficient fashion, in particular when lithium disilicate is used as the dental ceramics material.

17 Claims, 6 Drawing Sheets

(56) References Cited

U.S. PATENT DOCUMENTS

| | | | | |
|---|---|---|---|---|
| 5,605,459 A * | 2/1997 | Kuroda | ............... | A61C 7/002 433/214 |
| 5,823,778 A * | 10/1998 | Schmitt | ............... | A61C 9/00 433/214 |
| 5,879,158 A * | 3/1999 | Doyle | ............... | A61C 9/0053 433/24 |
| 6,049,743 A * | 4/2000 | Baba | ............... | G16H 50/50 700/163 |
| 6,303,059 B1 * | 10/2001 | Foser | ............... | A61C 13/20 264/16 |
| 6,485,305 B1 * | 11/2002 | Pfeiffer | ............... | A61C 13/08 428/542.8 |
| 7,967,606 B2 | 6/2011 | Sager | ............... | A61C 5/77 433/173 |
| 2001/0023056 A1 * | 9/2001 | Grunenfelder | ....... | A61C 1/0015 433/27 |
| 2004/0229185 A1 * | 11/2004 | Knopp | ............... | A61C 7/146 433/24 |
| 2004/0253562 A1 * | 12/2004 | Knopp | ............... | A61C 7/146 433/24 |
| 2005/0211414 A1 * | 9/2005 | Wiest | ............... | B22C 1/02 164/519 |
| 2006/0122719 A1 * | 6/2006 | Kopelman | ......... | A61C 13/0004 700/98 |
| 2007/0128580 A1 * | 6/2007 | Mormann | ......... | A61C 13/0022 433/201.1 |
| 2008/0142183 A1 * | 6/2008 | Marshall | ........... | B22C 7/02 164/36 |
| 2008/0220395 A1 * | 9/2008 | Marshall | ........... | A61C 13/0004 433/215 |
| 2009/0026643 A1 * | 1/2009 | Wiest | ............... | A61C 13/0004 264/16 |
| 2009/0081613 A1 * | 3/2009 | Ihde | ............... | A61C 8/0001 433/173 |
| 2009/0250450 A1 * | 10/2009 | Bertsch | ........... | A61C 13/20 219/390 |
| 2010/0021859 A1 * | 1/2010 | Kopelman | ......... | A61C 13/0022 433/50 |
| 2010/0058588 A1 * | 3/2010 | Heinz | ............... | A61C 3/02 29/896.1 |
| 2010/0119996 A1 * | 5/2010 | Kaigler, Sr. | ........ | A61C 13/0013 433/215 |
| 2010/0183998 A1 * | 7/2010 | Poirier | ........... | A61C 1/084 433/72 |
| 2010/0219546 A1 * | 9/2010 | Puttler | ........... | A61C 7/00 264/16 |
| 2010/0296710 A1 * | 11/2010 | Schneider | ......... | A61C 9/0053 382/128 |
| 2012/0095732 A1 * | 4/2012 | Fisker | ........... | A61C 5/77 703/1 |
| 2013/0029280 A1 * | 1/2013 | Jussel | ........... | A61C 13/20 432/32 |
| 2013/0130202 A1 * | 5/2013 | Vuillemot | ......... | A61C 13/0004 433/213 |
| 2014/0008826 A1 * | 1/2014 | Dierkes | ......... | A61C 13/0004 264/16 |
| 2014/0231615 A1 * | 8/2014 | Elnajjar | ......... | A61C 13/20 249/54 |
| 2015/0173864 A1 * | 6/2015 | Pomeranitz | ....... | A61C 8/006 433/174 |
| 2016/0340240 A1 * | 11/2016 | Vollmann | ......... | A61K 6/024 |
| 2017/0042647 A1 * | 2/2017 | Burke | ........... | A61C 13/082 |

* cited by examiner

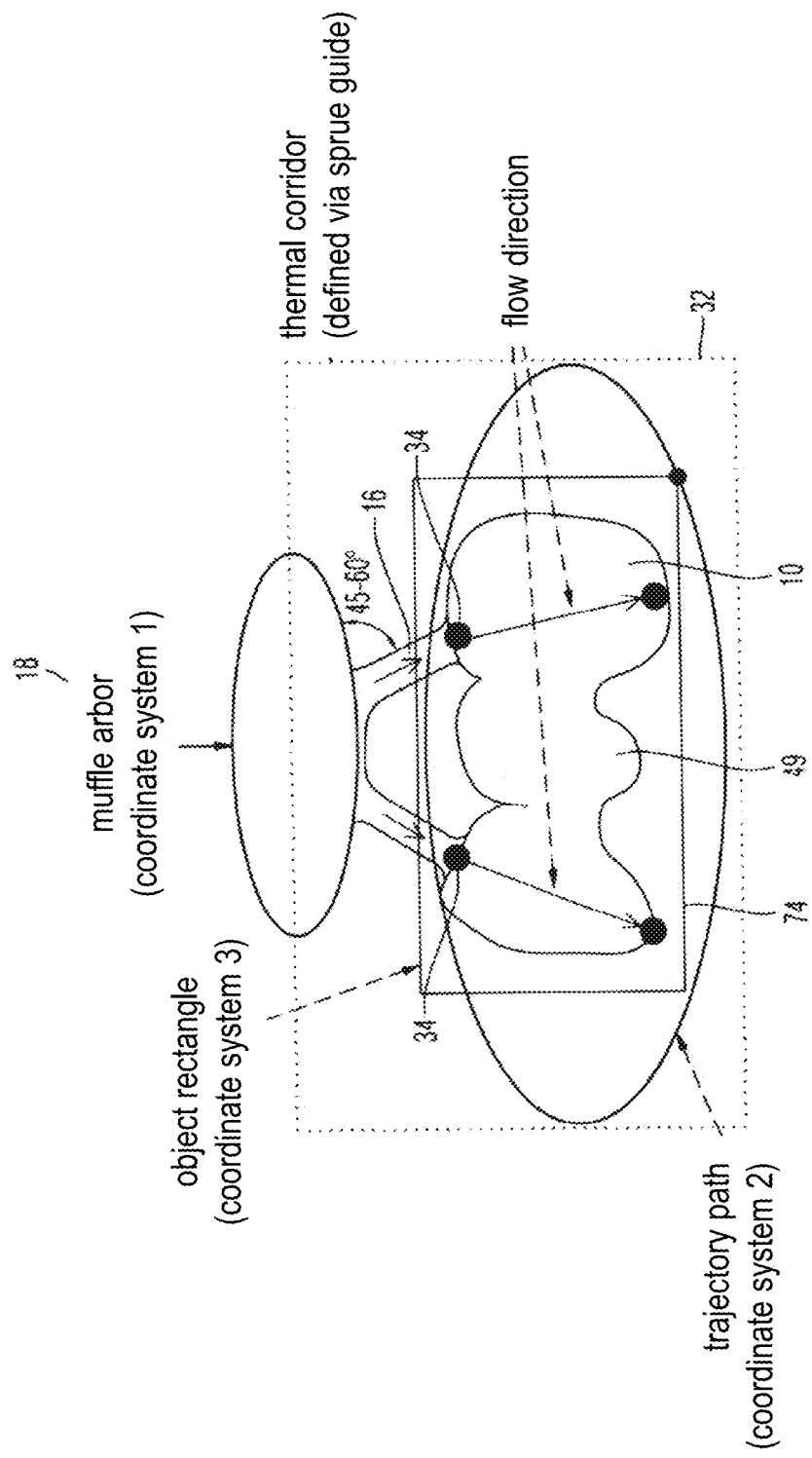

PROCESS AND DEVICE FOR MANUFACTURING A DENTAL RESTORATION

CROSS-REFERENCE TO RELATED APPLICATIONS

This application claims priority to European Application No. 14/171,268.7, filed on Jun. 5, 2014, now pending, the disclosure of which is incorporated herein by reference.

FIELD OF THE DISCLOSURE

The disclosure relates to a process for manufacturing a dental restoration as well as a dental ceramics production device.

BACKGROUND OF THE DISCLOSURE

Expendable molds have previously been used to manufacture dental restorations. For example, a positive model of the dental restoration is first manufactured in a suitable fashion in accordance with the preferences of a dental technician or a dentist. The positive model is made out of wax or out of another substance, such as a polymer, that can be incinerated without leaving residues.

The positive model is then connected with what is referred to as a muffle base via a conveyor channel which can, for example, comprise the same material as the positive model of the dental restoration as a pin-shaped element. This muffle base comprises a disc made from a plastic material, from which a peg-shaped projection rises up whose front surface is used as the base of the conveyor channel.

After the positive model has been applied together with the conveyor channel, a small radius can also be attached at the transition between conveyor channel and dental restoration on the one hand, and the front surface of the muffle base on the other hand, respectively, which is usually referred to as merging.

A silicon ring is then slipped over the disc-shaped muffle base, which is provided with a recess, and a self-hardening casting compound is cast into the inside space thus formed. This can, for instance, comprise of plaster or other suitable materials.

After hardening, the silicon ring is removed or rolled off, and the muffle base is pulled off. In this process, the connection between the front surface and the conveyor channel (or channels) is loosened while the wax components still remain in the hardened muffle.

The muffle is then heated to a temperature that makes it possible to remove the wax components without any residues being left behind. This can happen in what is referred to as a pre-heating furnace, for example, that provides a temperature of 700° C.

Subsequent to this, the muffle with the cavity or cavities which now remain in place of the positive model is turned around, such that the channel that corresponded to the peg of the muffle base lies free on top. This channel is at the same time the pressing channel, and a blank made of a material, such as a dental ceramics material, is inserted into it which is suitable for shaping the dental restorations.

A pressing furnace is provided with a pressing plunger which enters into the pressing channel and further heats up the blank together with the muffle in accordance with a predetermined pressing program, for example to a range of 1100° C. in case of a silicate or feldspar ceramic material, or to 1600° C. in case of an oxide ceramic material.

In accordance with an exactly predetermined pressing program, pressure and heating are controlled in unison with each other, such that the blank enters the cavity or the cavities via the conveyor channels when melting, and there the dental restoration is produced, if possible without any bubbles.

The process described above has been known for at least 30 years and is in wide-spread use today.

Recently, it has been practiced in many cases to take a scan of the patient's mouth for manufacturing the positive model, and via software the desired dental restoration is designed and produced.

It has also been suggested to use an additive process for the production of the positive model after the computer-controlled molding, for example, to produce the positive model by means of rapid prototyping. DE 103 32 802 A1 describes one such example.

Such rapid prototyping processes, which are basically suitable for dental technology with respect to resolution, such as for instance stereolithography, have also been known since the 1980s.

In the field of dentistry, the use of the technology of rapid prototyping for the manufacturing of models has at least been known for about 20 years and is shown, for example, in WO 95/28688 A1 in which the positive model technique mentioned above is also disclosed.

Despite the advantages of computer-assisted design, which have been known for quite a long time, this technology has not gained universal acceptance.

It has also been suggested to produce the dental restoration, instead of manufacturing it by means of pressing, with the help of a casting process. This technology too has been known for a long time.

It has been suggested to produce a positive model with the help of computer assistance, in an additive fashion in order to thus avoid the necessity of the step of milling. In this suggestion, during milling, complex inside corners can only be created with great difficulty. The casting of a mold cavity in a muffle makes it possible to provide the dental restoration at a central position inside the muffle. At this position, the muffle usually has a rather low temperature gradient, because the muffle is typically heated by a heater which annularly surrounds it, and if necessary, an additional heater is provided from underneath as well. In the outer portions of the muffle, the temperature gradient is usually considerably larger, especially with the fast heating of the muffle by the dental furnace which is aimed at the muffle.

The production of the dental restoration thus suggested, however, has two major disadvantages: First, in case of a central arrangement, only one single dental restoration can be produced with the help of a muffle, which is extremely inefficient. Second, the quality of the surface is lacking in comparison to pressed dental ceramics.

BRIEF SUMMARY OF THE DISCLOSURE

In contrast, the present disclosure allows the creation of a high-quality dental restoration in a very efficient fashion, in particular when lithium disilicate is used as the dental ceramics material.

One embodiment of the present disclosure can be described as a method for manufacturing a dental restoration for a patient. The method comprises designing a dental restoration based on a scan of the patient's mouth, using a CAD software module. The method further comprises producing a positive model of the dental restoration using a material that is removable from a mold without leaving a residue. The method further comprises producing, using the CAD software module, at least one conveyor channel for the positive model based on the dimensions of a muffle in relation to the size and shape of the positive model, wherein the conveyor channel is determined by defining a space within the muffle for arrangement of the dental restoration. The method further comprises removing the positive model using the muffle, wherein the muffle has a pressing channel which is connected via a conveyor channel with a cavity for the dental restoration corresponding to the positive model. The method further comprises inserting a blank of dental material into the pressing channel. The method further comprises heating and applying pressure to the blank such that the blank is deformed and dental material for shaping the dental restoration flows through the conveyor channel and fills the cavity. In this embodiment, the conveyor channel extends at an angle of between 0° and 130° away from an axis of the pressing channel, the axis being located essentially along an isotherm inside the muffle. In addition, a docking site is selected based on a position with the greatest wall thickness of the positive model, and the CAD software module positions the positive model in relation to the conveyor channel to elongate the axis of the conveyor channel and that the length of a virtual axis through the positive model is maximized.

In one embodiment, the CAD software module determines, based on the shape of the positive model, starting from the position with the greatest wall thickness of the positive model, a primary flow direction for the dental material in which the cross-section of the flow in a predetermined distance from the thickest position is greatest, and that the maximized virtual axis through the positive model deviates in the primary flow direction.

In another embodiment, the arrangement of the dental restoration within the muffle are determined by the CAD software module in such a fashion that the greatest longitudinal extension of the dental restoration essentially extends along an isotherm.

In one embodiment, if a plurality of dental restorations are manufactured at the same time, the plurality of dental restorations are positioned essentially along the envelope curve of a cone or taper and equally spread around the pressing channel which essentially terminates at the peak of the cone or taper.

In another embodiment, the method of claim 1, wherein the conveyor channel is provided with radii and/or constant transitions in the direction towards the pressing channel, and in the direction towards the dental restoration.

In one embodiment, the conveyor channel determines the alignment of the dental restoration, and an alignment of the dental restoration is determined such that a penetration length of the conveyor channel through the dental restoration is maximized.

In another embodiment, the dental restoration is formed as a crown or a bridge and the basal area of the crown extends in elongation of a pressing channel axis with an open side away from the pressing channel.

In one embodiment, the dental restoration is formed as a prefacette or a veneer and the basal area of the prefacette or the veneer extends such that it points radially outwards in relation to a pressing channel axis.

In another embodiment, an alignment of the dental restoration with respect to the conveyor channel axis is selected such that the elongation of the conveyor channel axis through the dental restoration extends through the center of mass of the dental restoration when the conveyor channel axis is positioned at the thickest position of the dental restoration.

In one embodiment, the CAD software module connects the conveyor channel, in relation to the outside surfaces of the dental restoration, in an eccentric or off-center fashion.

In another embodiment, the length of the conveyor channel is determined by the CAD software module depending on the size and the weight of the dental restoration.

In one embodiment, if a number of dental restorations are arranged in one muffle, the CAD software module determines the conveyor channels to the dental restorations such that the dental restorations are arranged at regular intervals within an isothermal corridor such that the arrangement of dental restorations approximates a taper or cone.

In another embodiment, the CAD software module accesses a conveyor channel library which indicates different profile designs, lengths, docking points and angles of conveyor channels based on sizes and types of dental restorations, and that the CAD software module, based on these values, determines or suggests the conveyor channels with regards to their lengths, their diameters, and their angles.

In one embodiment, the virtual inside is dependent on the size of the muffle and releases a placing space of the dental restoration within the muffle such that the dental restoration keeps a distance from the muffle of at least 2 mm with respect to the outside wall of the muffle and the height of the virtual inside space is lower in a radially inwardly direction than in a radially outwardly direction.

In another embodiment, the positive model is manufactured by a milling process and a milling blank is formed as a cylinder with a cylinder height corresponding to the virtual space of between 15 mm and 50 mm.

In one embodiment, at least one conveyor channel is formed as a dummy channel without an associated dental restoration.

In another embodiment, the length and thickness of each conveyor channel relative to the other conveyor channels is selected such that it is adapted to the volume of its associated dental restoration.

The present disclosure may also be described as a dental ceramics production device. The device may comprise a CAD/CAM device for providing a pressing mold for manufacturing a dental ceramics. The device may further comprise a CAD software module executed by the CAD/CAM device.

The CAD software module may be configured to determine the shape of a dental restoration, based on a scanning result of a mouth of a patient. The CAD software module may be further configured to determine the configuration of the dental restoration using an expendable muffle. The CAD software module may be further configured to determine the arrangement of an angle and dimensions of a conveyor channel between a central pressing channel and a cavity for shaping the dental restoration inside a virtual inside space within the muffle. The CAD software module may be further configured to determine the work angle of the dental restoration in relation to a conveyor channel axis of the associated conveyor channel at a docking site of the dental restoration at the conveyor channel, the docking site positioned at the thickest position of the dental restoration, such that an elongation of the conveyor channel axis extends through the largest possible length of the dental restoration starting from the thickest position, in particular based on a pre-set library of shapes of dental restorations and/or conveyor channels.

In one embodiment, the docking site of the dental restoration at the conveyor channel is selected by the CAD software module at the position at which a ball with the largest possible diameter fits into the dental restoration, wherein an elongation of the axis of the conveyor channel extends in particular essentially through the center of this ball.

In another embodiment, each dental restoration is determined by the CAD software module in the virtual space with regards to its arrangement and alignment such that it has a marginal distance both from the outside wall of the muffle and from the neighboring dental restoration which does not exceed a pre-determined value.

In one embodiment, the docking site of the dental restoration at the conveyor channel in a vertical projection in relation to the muffle is selected in such a fashion that a narrow position of the dental restoration is arranged radially inwards and a wider position further outside radially.

In another embodiment, the conveyor channel and/or the dental restoration is provided with a code or an identification at a basal or a covered position, which facilitates the association with the order concerned and/or the patient concerned.

In one embodiment, wherein the dental restoration is provided with a constant and layer-by-layer construction which is suitable for stereolithography, in particular with an envelope curve whose slope is always larger than or equal to zero over its entire extension from docking site of the dental restoration in the lateral view or observed in the direction of the pressing channel axis.

In accordance with the disclosure, the dental restoration may be produced in a virtual space inside the muffle using a special CAD software module for the production of the positive model of the dental restoration and determine the position in accordance with particular criteria. An embodiment of positive models suitable for a multitude of tooth shapes and types of dental restorations may be created such that the models extend over the conveyor channels in a fashion resembling a tree. The pressing channel insofar basically forms the trunk of this "tree", and the conveyor channels form the branches at the top of each of which one dental restoration is usually provided. Preferably, both the conveyor channel and the dental restoration itself extend with their main axes, respectively, along an isotherm, which leads to lower temperature gradients within the cavity for the dental restoration during the process of pressing.

As a result of the automatic production of the conveyor channel and the dental restoration, faults, which have often lead to compensation claims against the producers, can be reduced, and also the number of dental restorations produced at the same time can be increased.

For example, using the present disclosure, it is possible to define a minimum distance between neighboring dental restorations, such as 3 mm, and to position the dental restorations with the help of the positive models produced by means of rapid prototyping in such a fashion that they are displaced in space in relation to one another, on different levels, and in a circle, without there being the risk of a deterioration in quality. The "multiple-layer arrangement" of dental restorations resulting can be advantageous, in particular, with newer pressing furnaces which are provided with underneath heating for the muffle, as a result of which the isotherms of the muffle extend in a different fashion than with a mere annular heating.

In accordance with the disclosure, it may be advantageous that the pressing process can be enhanced with a number of dental restorations created in parallel. For example, the flow resistance of the heated ceramic material which is used for creating the dental restoration can be adapted by means of dimensioning of the respective conveyor channel.

The adaptation may be put into practice in such a fashion that the dental restorations (i.e., the corresponding cavities in the muffle) are completely filled at the same time. With smaller volumes of the dental restoration, one will correspondingly have a thinner or longer conveyor channel produced by the module, and will vice versa, with a bridge with a number of segments of a correspondingly large volume, have the conveyor channel or the conveyor channels put into practice shorter or thicker.

While the prior art teaches away from producing different dental restorations in the same pressing step, in particular with silicate ceramics, it is possible without any problems in accordance with the disclosure, to produce at the same time even very large and very small dental restorations, which further contributes to an increase in efficiency. For example, restorations made out of lithium disilicate have a very low shrinkage, and can thus be provided in a particularly quick and economic fashion.

The measures of the alignment of the dental restoration (and the cavity and the positive model, each respectively) in accordance with the disclosure include the selection of the position with the largest wall thickness of the dental restoration as the docking site of the conveyor channel at the dental restoration, and then aligning the dental restoration in such a fashion that its longitudinal axis corresponds to the axis of the conveyor channel. This measure results in a dental restoration which can be produced particularly favorably which makes it possible to produce the positive model additively by means of rapid prototyping, for instance with the help of stereolithographic processes, and also in the absence of any bubbles.

When casting the positive model with the help of liquid casting material, such as plaster, there is regularly the risk of cavities remaining which are not filled by the casting compound; the risk existing insofar is minimized by the alignment in accordance with the disclosure.

On the other hand, there is the risk in the process of pressing that bubbles remain in the ceramic material which entail a deterioration of quality. By using the inclined arrangement in accordance with the disclosure in combination with the feature mentioned above, this risk is minimized as well in accordance with the disclosure.

The conveyor channel may extend in an inclined fashion away from the pressing channel and its axis and extends insofar in an inclined fashion through the muffle, since the axis of the pressing channel regularly coincides with the axis of the muffle arbor.

In accordance with the disclosure, it is also intended to adapt the inclination in a certain way to the type of heating of the muffle. In case the muffle is heated from underneath, the overall possible angular range of between slightly more than 0° and 120° or 130° in relation to the axis of the muffle or the pressing channel, respectively, is available. In the case of an annular heating, in contrast, for example, the axis may be kept at an angle of between 40° and 65°, based on the narrower area of the isothermal corridor.

In accordance with the disclosure, the virtual inside space can be determined as a result of the predetermined limits of distance, i.e. a predetermined distance to the pressing channel and a predetermined distance to the outer wall of the muffle, and also upwards and downwards, within which limits the module has to arrange the dental restorations including the conveyor channels. As a result of that, it is made sure that the muffle does not crack due to too low wall thicknesses, and also that the marginal conditions with regards to isothermality are adhered to.

In this connection it is to be understood that the possible matching of temperatures within an area referred to as being isothermal strongly depends on the ceramic material to be pressed. For instance, feldspar ceramics can have a larger range of isothermality or range of paramoi thermality, i.e. a range of similar temperatures, than lithium disilicate ceramics. Also these marginal conditions can be taken into account with the help of the CAD software module in accordance with the disclosure, such that a displacement of levels with the corresponding compaction of the arrangement of dental restorations observed in a tangential direction not only in case of heating from underneath, but also depending on the material.

In accordance with the disclosure, the arrangement may be automatically adapted as well as the number of conveyor channels to the type and number of dental restorations. If, for example, a bridge of eight segments with three conveyor channels which end each at the respective thickest position of the corresponding teeth are selected as the docking sites and extend in a slightly curved fashion, the inside space of the curve thus produced can be used for placing another dental restoration together with the corresponding conveyor channel within the virtual inside space.

In one embodiment, it is intended that the alignment of the dental restorations can be modified in such a fashion that it extends in an elongation of the conveyor channel axis, which is essentially with the maximum length of the virtual axis through the positive model, however slightly tilted in the direction of the primary flow direction, i.e. in most cases in the occlusal direction. This leads to a slightly lower degree of re-direction of the flow at the docking site, which further reduces the tendency to form bubbles. For instance, the re-direction of the primary flow direction out of the conveyor channel can thus be reduced from 30° to 20°, such that the dental restoration is positioned in such a fashion that it is tilted by 10° in relation to the maximum length of the virtual axis.

In another embodiment it is intended that the dental restorations are positioned around the pressing channel, but still slightly spaced apart from its front surface. Between the front surface and the dental restorations, the conveyor channels then extend (which are determined each by the CAD software module) and the module spreads the dental restorations preferably in a uniform fashion in this area in an inclined fashion in front of the front surface of the pressing channel. The dental restorations and conveyor channels may essentially form a taper or a truncated cone insofar, with the front surface as the truncated cone or tapered surface, and extend only slightly, still in the area of isothermality, outside the taper surface.

An axisymetric arrangement of the muffle and the pressing channel may be used in accordance with the disclosure, and may be used to achieve an improved result of the pressing process based on the embodiment in accordance with the disclosure. However, the muffle is not restricted to a cylindrical muffle. Muffles according to the present disclosure may have other shapes, for example, a muffle may be pear-shaped when observed from the side, or may be cloverleaf-shaped when observed from the top, etc.

As a result of the constant transitions or radii between the conveyor channels and the pressing channel, which are intended in one embodiment, on the one hand and also the dental restoration on the other hand it is prevented that muffle material existing there is subjected to excessively high pressure during the pressing process and accordingly cracks. Such flow transitions may be advantageous as far as the flow is concerned and reduce the counter pressure in pressing during the shaping process to the necessary minimum amount.

As an additional issue for the alignment of the dental restoration, i.e. the selection of the docking site, the CAD software module can take into account that the passage length through the dental restoration may be maximized. For this purpose, the CAD software module creates the shortest vector to the position of the dental restoration farthest away from the docking site and maximizes this length for the exact selection of the docking site.

The alignment of the dental restoration relative to the conveyor channel axis is then selected in such a fashion that an axis between the center of the docking site and the remotest point of the dental restoration form a virtual axis which extends in elongation of the conveyor channel axis.

Also this arrangement can be displaced slightly in the occusal/incisal direction, for example by 10° or 15°, in order to reduce the re-direction of the flow.

It is furthermore intended in accordance with the disclosure to align open surfaces, i.e. surfaces in proximity of the basal surface, of the dental restoration radially outwards with relation to the pressing channel axis. This may avoid the formation of small bubbles and alter the effect of temperature gradients.

In one embodiment, the center of mass at the thickest position of the wall of the dental restoration can also be of assistance in determining the angle orientation of the latter in relation to the conveyor channel axis, the dental restoration can be aligned in such a fashion too that the elongation of the conveyor channel axis extends through that.

In another embodiment, it is intended that the CAD software module determines the length of the conveyor channel depending on total weight. Here, the length of the conveyor channel may amount to distinctly less than the length of the main extensional direction through the dental restoration, and amounts—depending on its size and weight—to between 30% and approximately 70% of the length of the main extensional direction.

The conveyor channels can also be stored in a library, and the CAD software module can then select which of the conveyor channels from the library existing in advance will suitably be employed.

While for the realization of the positive model, the production by means of rapid prototyping can be used, for instance with the help of stereolithography or of FDM, it is also possible in case of structures of easier design which are less complex, to produce the positive model by means of computer-controlled milling. In this, blanks, for example made out of a polymer, polyacrylics or wax, can be employed which are realized in the shape of discs with a height of 20 mm or 25 mm.

Instead of this "pancake" cylinder, an upright cylinder can also be put into practice as a milling blank, which can then have a height of 50 mm, for instance.

In accordance with the disclosure, with the help of a corresponding furnace-related specification, the CAD software module can provide an angle corridor for the realization of the dental restorations, which makes it possible to always place the dental restorations within an isothermal corridor. The virtual space predetermined insofar is moreover predetermined in the horizontal direction by a minimum marginal distance of, for example, 10 mm to the outer wall of the muffle, and also to the pressing channel, which corresponds to the muffle arbor. For the more precise setting of the conveyor channel, the CAD software module takes into account in particular also the volume of each associated dental restorations and thus sets the length and thickness of the conveyor channel based on this. In addition, the size of the muffle can be determined based on the number of dental restorations to be manufactured, wherein the standard sizes of 100 g, 200 g and 300 g of muffles of corresponding known dimensions can be kept ready.

In one embodiment, it is intended herein with only very few dental restorations to be produced to put into practice a conveyor channel as a dummy channel. This channel serves for the purpose of damping an abrupt increase in pressure towards the end of the pressing process in order to further reduce the risk of the muffle cracking.

In another embodiment, it is intended to provide the base of the conveyor channel in a standardized fashion. This can have a projection which positively engages with the muffle arbor and is stored in the conveyor channel library as the zero point of the virtual inside space for providing the conveyor channels. For example, the muffle base (i.e. the muffle peg projecting from the disc-shaped base) can be provided with a central recess which positively accommodates the corresponding projection of the conveyor channel base.

At the conveyor channel base, the conveyor channel or the multitude of conveyor channels is then preferably built up. The conveyor channel base is insofar a disc which is provided with a positive-connection element, for instance a projection, which can be engaged with the muffle arbor, or makes possible another connection.

Alternatively, an apron can also be provided at the outer circumference of the conveyor channel base, which encloses the muffle arbor.

From the upper surface of the conveyor channel base, the conveyor channel or channels extends away laterally in an inclined direction. The angle of the conveyor channel axis is put into practice in accordance with the above defaults, and the desired marginal distances (i.e. the distances between the dental restorations on the one hand and the margins of the muffle on the other hand) can be set with the help of the selection of the place of the starting point of the conveyor channel on the conveyor channel base determined in accordance with the defaults.

If the conveyor channel is in a position inclined by 45°, for instance, the vertical position of the dental restoration can be increased in that the starting point of the conveyor channel is displaced radially inwardly. As a result of this, the conveyor channel is virtually automatically (provided the angle is constant) elongated. The flow-related effects of this elongation can, however, in turn be compensated by enlarging the diameter of the conveyor channel, in accordance with the disclosure.

Based on the conveyor channel angle optimized with regards to the isothermal corridors, the dental restorations can accordingly and in accordance with the disclosure have alternating larger and smaller vertical heights, observed from the side, in order to thus provide a space-optimized tree of dental restorations

DESCRIPTION OF THE DRAWINGS

For a fuller understanding of the nature and objects of the disclosure, reference should be made to the following detailed description taken in conjunction with the accompanying drawings, in which:

FIG. 9 is a schematic depiction of another positive model and its conveyor channels, including their position in virtual space.

DETAILED DESCRIPTION OF THE DISCLOSURE

Figure 1:
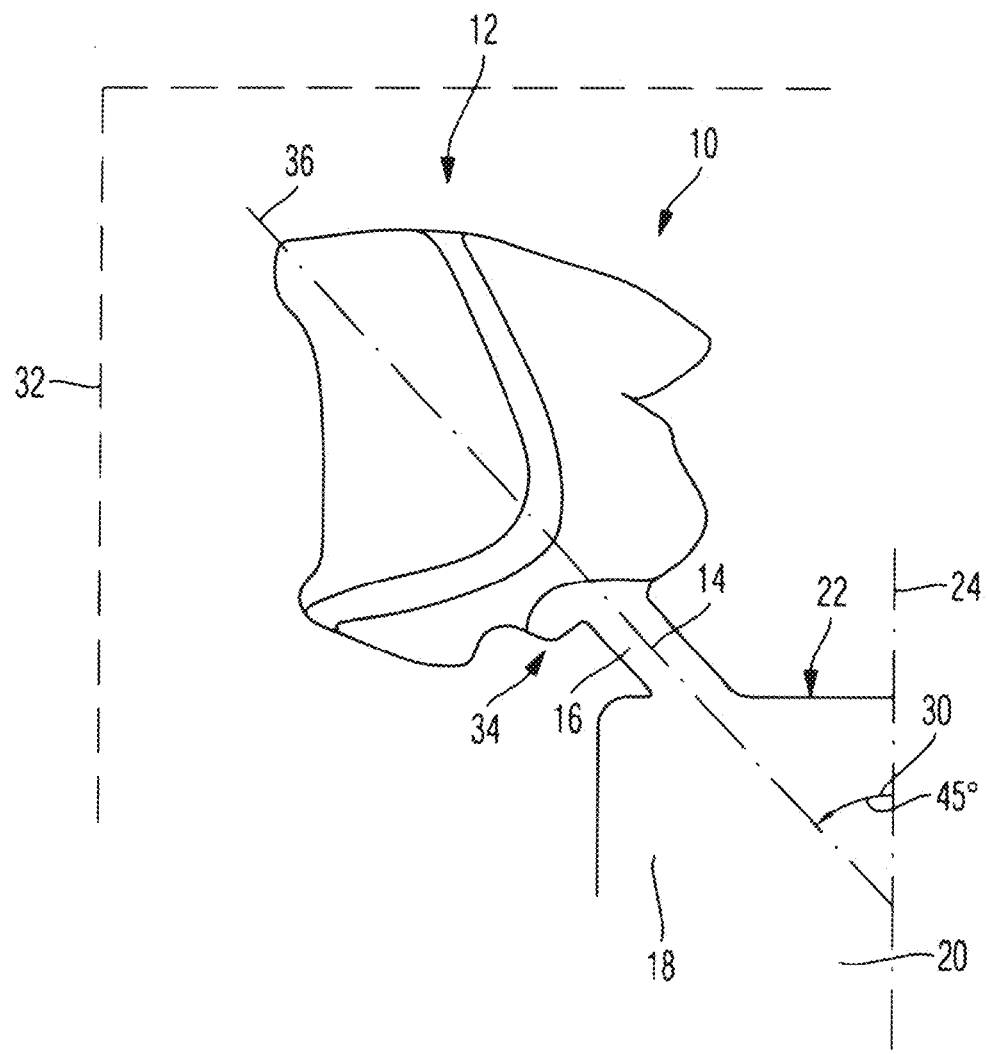
FIG. 1 is a schematic view of a positive model of a dental restoration, together with the conveyor channel which was already automatically produced by a module of a CAD software, which conveyor channel emanates from a pressing channel.

In FIG. 1, a positive model 10 of a dental restoration 12 is depicted together with its position in space. As can be seen, an axis 14 of a conveyor channel 16 extends straight through positive model 10, starting from a muffle arbor 18 or a pressing channel 20, respectively, or, to be more precise, starting from their front surface 22, which is at a predetermined angle to an axis 24 of muffle arbor 18 or pressing channel 20, respectively, which here amounts to 45°.

With the help of this depiction, one embodiment of the process in accordance with the disclosure can be explained.

For putting into practice one process in accordance with the disclosure, the position of the tooth of the dental restoration is, or the positions of the teeth of the dental restorations are, first recorded. This includes the position of the tooth inside the mouth, i.e. for example 21, 22 etc., additionally the type and number of dental restorations—i.e. for example bridge, crown, inlay, veneer, prefacette etc.—and also the pressing conception. This also includes the pressing program for the subsequent pressing process in the pressing furnace; this is selected in the dental restoration production device in accordance with the disclosure with the help of a menu item. With this selection, it is possible to optionally determine whether the dental furnace is, for instance, provided with annular heating or additional underneath heating for the muffle, each of which comprises different angle defaults of angle 30 from axis 14 to axis 24.

Based on this pressing concept, a corresponding library of conveyor channels—including their possible angles—is additionally offered.

With setting the pressing concept, the selection of materials of the ceramics to be used (for example oxide or silicate ceramics) results as well.

Before or possibly also after these determinations, the dental restoration may be determined in such a fashion that it matches its neighboring teeth in their shapes, arrangement inside the oral cavity and so on, based on a digital scan of the patient's mouth. From this, the volume of the respective dental restoration is automatically calculated, from which also the overall volume of the dental restorations results which are to be produced at the same time in accordance with the disclosure.

Also the position of the dental restoration in relation to the neighboring teeth may be determined by the CAD software, i.e. in a mesial/distal direction, in an occlusal/cervical direction, in the rotational position around the tooth axis and so on. This also includes the development of the wall thickness of the dental restoration and the positive model, respectively.

After the size of the muffle has been determined after total weight, based on a special module of the CAD software the position of positive model 10 in a virtual space 32 is determined in accordance with the disclosure.

In one example, the total volume is to be 1.9 cm$^3$, such that a muffle of 200 g is sufficient; a corresponding muffle base with a corresponding muffle arbor 18 belongs to that.

Positive model 10 in accordance with FIG. 1 have a share in the total weight of 0.4 cm$^3$, while a total of 6 further positive models, which are not depicted here, extend in a circular fashion or tapered fashion and starting from muffle arbor 18 around the latter in virtual space 32 in a corresponding alignment to the alignment of positive model 10.

In the exemplary embodiment depicted, the pressing conception is determined for a pressing furnace with annular heating; as a result of this, the possible range of angle 30 is restricted to values between, for instance, 25° and 50°, and virtual space 32 is correspondingly smaller compared with a furnace with underneath heating.

The module now produces, based on a marginal distance to the margin of the muffle of, for example, 10 mm, an optimized arrangement of positive models 10 in space. By means of elongating conveyor channels 16, dental restorations 12 are displaced farther in the direction towards the outer circumference, however keeping in mind the marginal distances. The distance from front surface 22 to the upper end of virtual space 32 is also restricted in the exemplary case, here to 16 mm, and as the default length for the length of the conveyor channel, 3 mm to 8 mm are predetermined. The total length of dental restoration 12 along axis 14 and including the length of conveyor channel 16 amounts, in accordance with the default from the software module, to 16 mm in this exemplary embodiment, and the minimum distance of dental restorations 12 from each other amounts to 3 mm.

The selection of angle 30 results in the primary arrangement within a thermal corridor which has a similar temperature range. The alignment of dental restoration 16 with relation to axis 14 also contributes to this, and so does the selection of docking site 34 too. Angle 30 is determined in accordance with the alignment of the isothermal corridor specifically for the furnace.

In the exemplary embodiment depicted, docking site 34 has been selected where the wall thickness of positive model 10 and dental restoration 12, respectively, is at its maximum, in the exemplary case at a mesio-buccal cusp. The alignment of dental restoration 12 with relation to axis 14 is now done in such a fashion that a virtual axis 36 of the dental restoration, which extends through this from the position of the maximum wall thickness to the position of the dental restoration which is farthest away (i.e. the maximum longitudinal extension of the latter) coincides with axis 14 of conveyor channel 16, and insofar extends in elongation of the latter. As can be taken from FIG. 2 in comparison with FIG. 1, no co-axial, i.e. exactly coinciding, arrangement is meant herewith, but rather an elongation, for instance with a possible angular deviation of 15°, wherein with regards to optimization reference is insofar made to the subsequent description.

Based on the marginal conditions existing insofar, conveyor channel 16 is now selected from the library of conveyor channels, and with the help of the module, the overall arrangement of positive models 10 including conveyor channels 16 is thus determined.

In a shaping step, the overall arrangement of positive models 10 and conveyor channels 16 is now produced by means of rapid prototyping, which—at least in the present case—is of tree-shaped arrangement.

The creation of the arrangement of positive models is done with the help of a material which is removable without leaving residues, such as polyacrylics or also any other suitable polymer which is suitable for rapid-prototyping procession and is characterized by particularly good shape accuracy.

When using the technology of stereolithography, thus an accuracy of manufacture of, for example, 50 μm can be guaranteed, which meets all requirements.

As can be taken from FIG. 1, the basal surface of the object extends in a downward/outward direction in relation to muffle arbor 18. The arrangement of dental restorations 12 and positive models 10, respectively, in a top view from above is done principally similar to a cake, such that the smallest width of positive models 10 is directed towards the inside, i.e. in the direction facing pressing channel axis 24.

The basic alignment of positive models 10 is done in the flow direction, i.e. corresponding to the elongation of axis 14.

Figure 2:
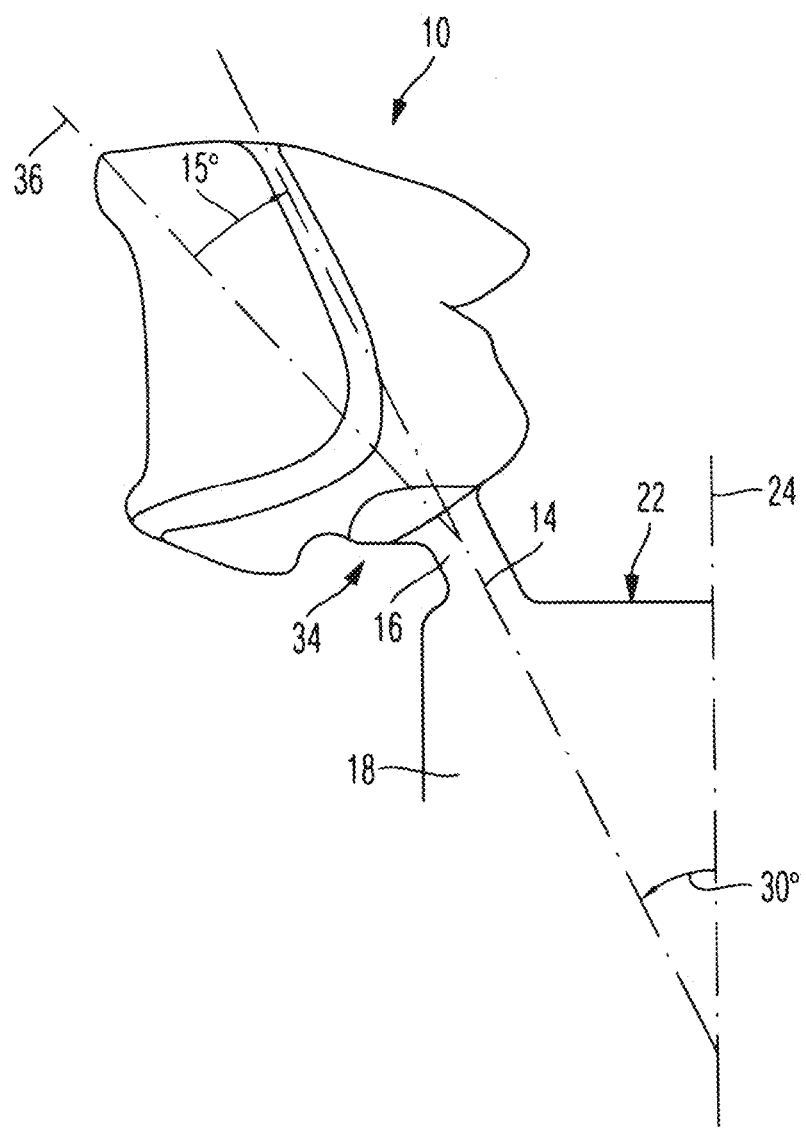
FIG. 2 is a modified embodiment of the positive model of the dental restoration in accordance with FIG. 1, with a different angle of the conveyor channel.

In accordance with FIG. 2, virtual axis 36 of the dental restoration is slightly inclined in relation to axis 14 of conveyor channel 16. Hereby, is taken into account to minimize the re-direction of flow, such that the main flow of fluid dental material through the corresponding cavity happens slightly underneath the longitudinal fissure of the molar there, but in any case one stronger approximated to the occlusal direction than is visible from FIG. 1. In the direction not visible from FIGS. 1 and 2, i.e. transverse to the drawing layer, the alignment is done in that way that each of the main flow directions extends through the crown center in any case.

As is also visible from FIG. 2, conveyor channel 16 extends starting from a position of front surface 22 lying rather far towards the outside. It is quite short, in the exemplary case only 3 mm, wherein it is to be understood that also a larger length of the conveyor channel is possible if a higher number of objects are to be accommodated in virtual space 32.

Larger lengths of the conveyor channels have, as is known, a larger flow resistance due to the existing wall friction. In order to compensate for this, the diameter of the conveyor channel is then enlarged in accordance with the defaults of the conveyor channel library.

While the positioning in accordance with FIGS. 1 and 2 intends that the occlusal surface is positioned inside (i.e. adjacent to) pressing channel axis 24, and accordingly the basal surface in the outward/downward direction, it is also possible to reverse this arrangement. This alternative arrangement may be favorable in case of a mere annular heating of the pressing furnace since then the area of larger mass of the dental restoration lies within the area of higher temperatures. In addition, the tendency of the muffle to form cracks is reduced in those cases in which round surfaces extend in parallel with the walls, and in any case no sharp edges.

Figure 3:
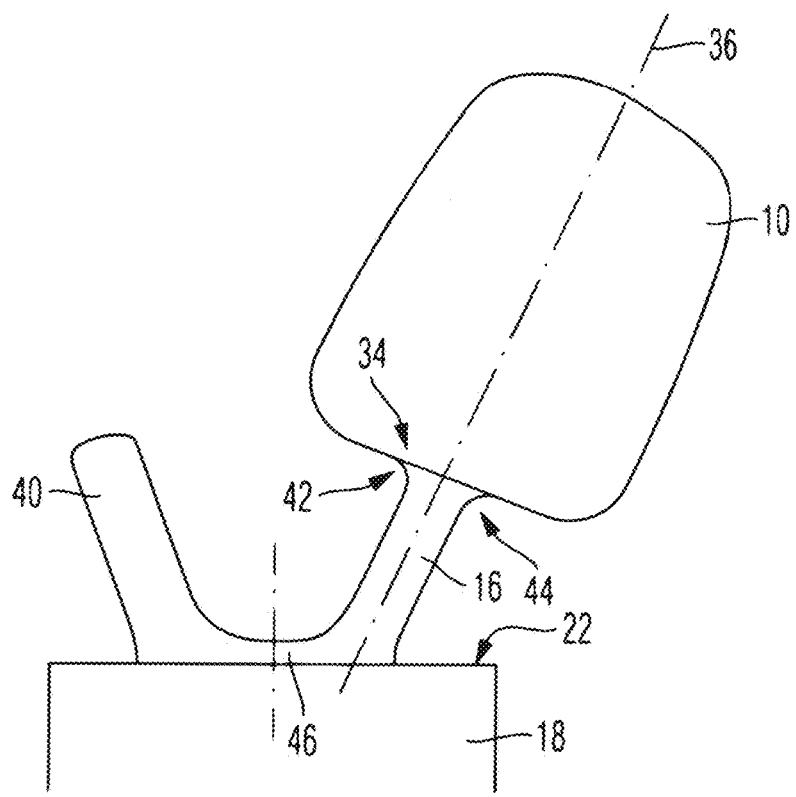
FIG. 3 is a third exemplary version of a dental restoration or a positive model, respectively, which is manufactured by means of applying a process in accordance with the disclosure.

It is visible from FIG. 3 in what fashion a crown for a front tooth can extend. With this solution, only one single dental restoration is provided in a 100-g muffle, and due to the low total volume of only 0.3 cm³ it is intended to put into practice a dummy channel 40 as an additional conveyor channel 16, which—created also by means of rapid prototyping—extends towards conveyor channel 16 of dental restoration 10.

From FIG. 3—and further Figures—it is also visible that radii 42, 44 are provided on the input side of the positive model, which are selected with respect to the flow and also prevent burrs of plaster, which would otherwise exist there, from breaking off as a result of the compression pressure and contaminating the dental restoration.

As is visible from FIG. 3, on front surface 22 of muffle arbor 18, a conveyor base 46 is formed which is also produced by means of rapid prototyping. Conveyor base 46 creates the connection between the different conveyor channels 16, and at the same time abuts on front surface 22 or is anchored there with the help of means of positive connection or with the help of an adhesive bond.

Docking site 34 is provided, in the arrangement in accordance with FIG. 3, in the incisal area, approximately centrally. This results in a maximized length of virtual axis 36 in such a fashion that it extends essentially in elongation of axis 14.

In this exemplary embodiment, stereolithography may be employed for rapid prototyping. This does not allow any negative layers, such that for technical reasons a displacement of conveyor channel 16 in a direction radially outwards—in relation to axis 24—results. As a result, docking site 34 is displaced into the a proximal area compared with FIG. 3, and axis 36 extends in a more inclined fashion than with FIG. 3 towards axis 14 of conveyor channel 16.

Figure 4:
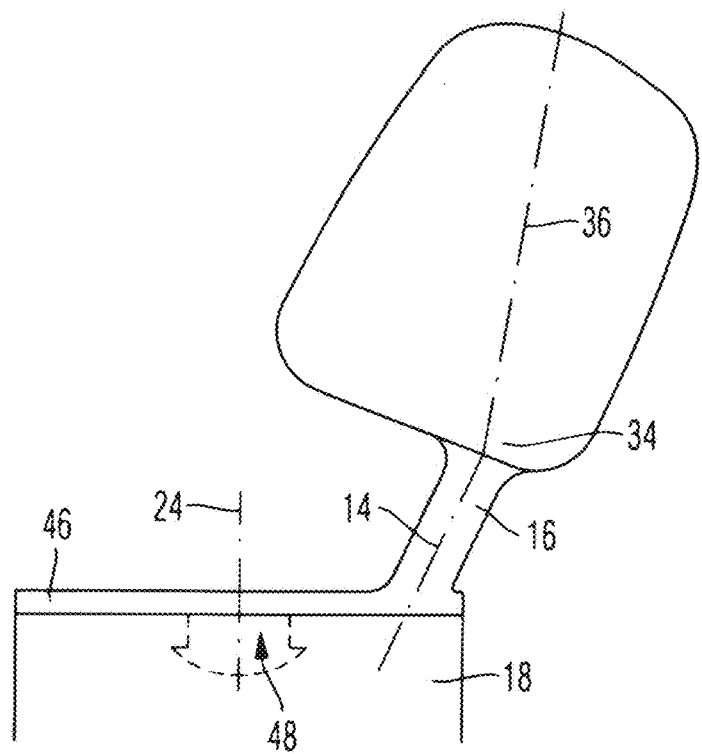
FIG. 4 is a modified embodiment of the production in accordance with FIG. 3.

From FIG. 4, a correspondingly widened conveyor base 46 can be taken, and also in what fashion the material of conveyor base 46 can pass through an opening 48 in muffle arbor 18 and engage with it in order to put into practice a safe fixation of conveyor base 46.

Figure 5:
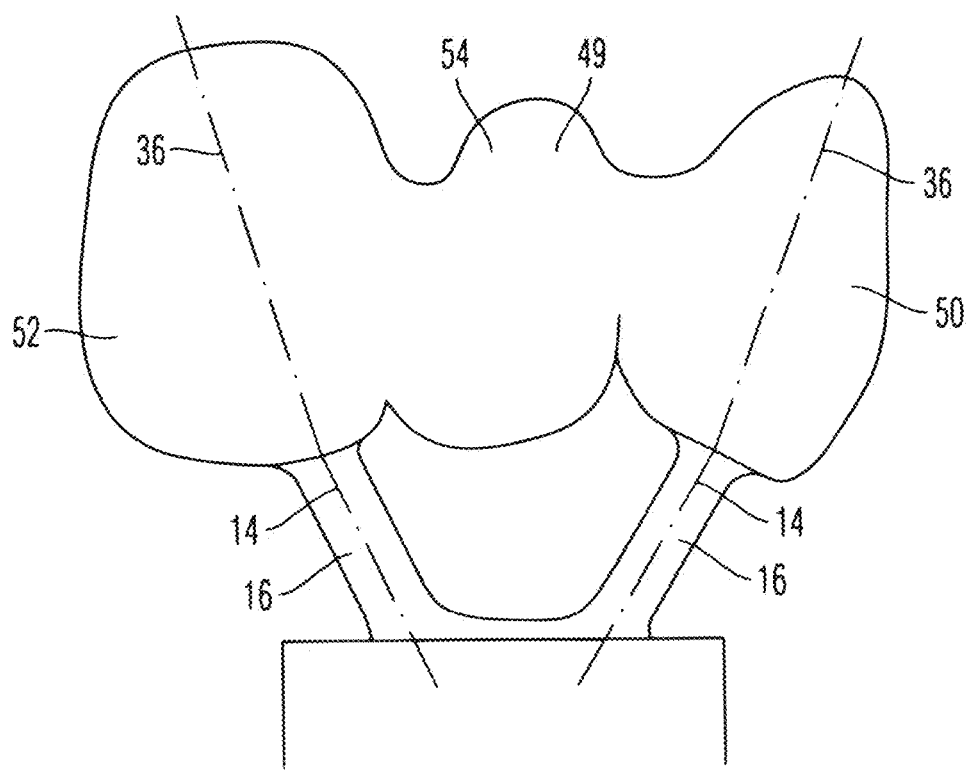
FIG. 5 is a schematic depiction of a positive model equipped with conveyor channels for use in a dental restoration production device in accordance with the disclosure.

In FIG. 5, the arrangement of a bridge 49 as a dental restoration is depicted. Conveyor channels 16 extend towards abutment teeth 50 and 52 in its occlusal area, while bridge segment 54 remains free of any conveyor channels.

Here as well, virtual axes 36 extend through the longest possible extension of abutment teeth 52 in elongation of axes 14 of conveyor channels 16. As a result of the higher volume of the dental restoration and its weight, respectively, only a 200 g muffle can be used here, and the conveyor channels are elongated to 5 mm in view of the more voluminous dimensioning.

Figure 6:
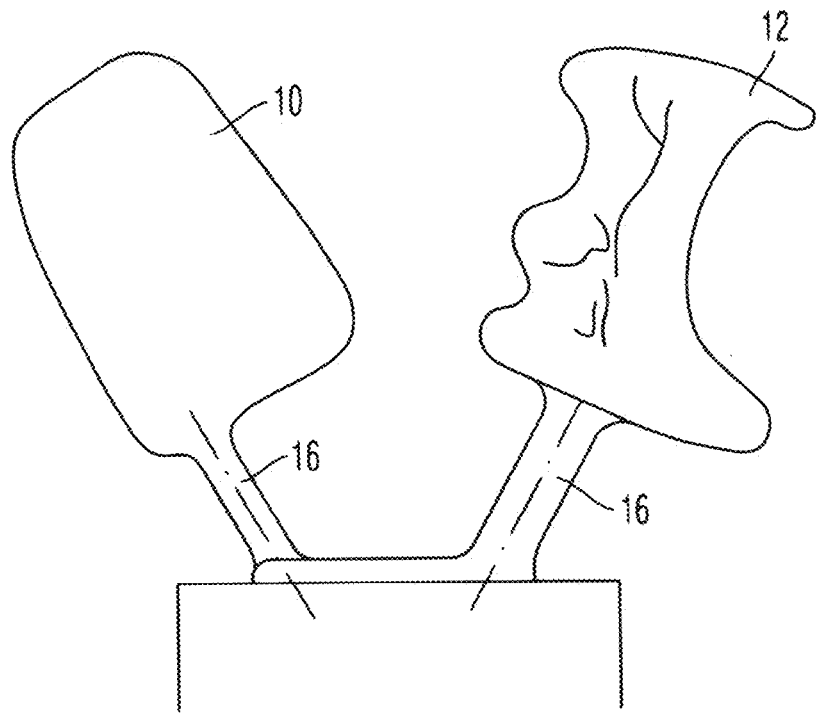
FIG. 6 is another depiction of a positive model for use in a dental restoration production device in accordance with the disclosure.

Putting into practice a bridge does not exclude that at the same time and in the same muffle, single-tooth dental restorations or their positive models can be formed respectively. For example, a dental restoration 12 in accordance with FIG. 6 can be shaped at a different angular position than bridge 49 in accordance with FIG. 5 at the same time.

Figure 7:
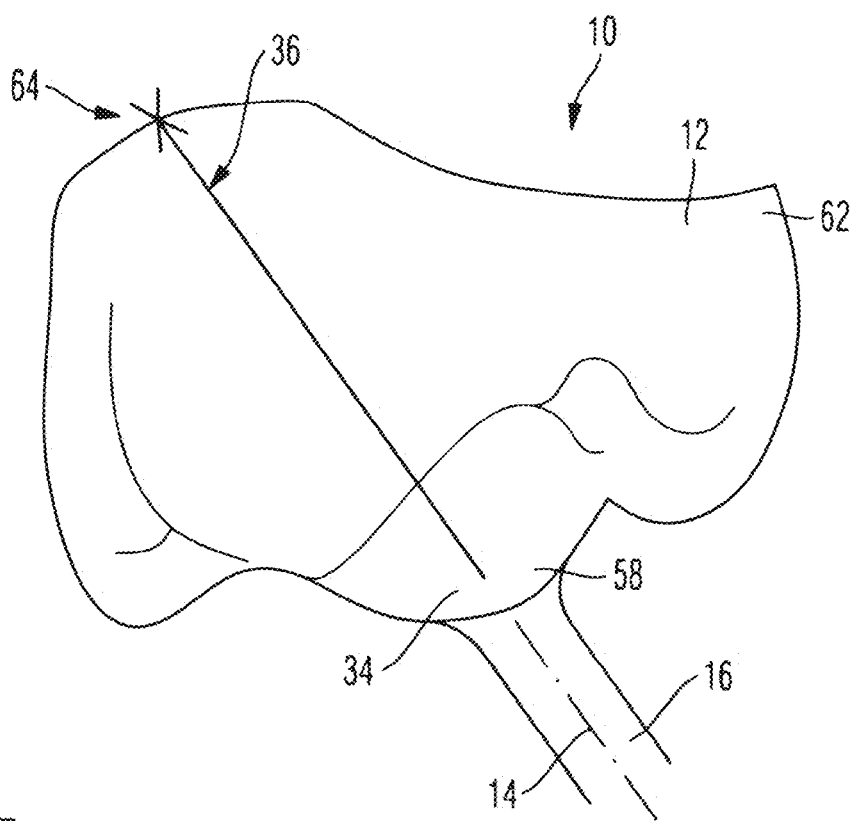
FIG. 7 is a schematic depiction of the alignment of the positive model in a process in accordance with the disclosure.

From FIG. 7, another arrangement of a dental restoration 12, which is a side tooth crown, in relation to its conveyor channel 16 can be taken.

As docking site 34, mesio-palatinal cusps 58 are selected, and the CAD software module rotates dental restoration 12 and positive model 10, respectively, in such a fashion that length L of virtual axis 36 through dental restoration 12 is maximized.

When the dental material flows in, the filling process is done starting from the docking site in the flow direction essentially with a uniform front of dental material. This results in that basal area 62 is filled with dental material before area 64 is filled which is farthest away from docking site 34 and is also basal, however is positioned slightly more cervically.

The front of dental ceramic material therefore experiences some resistance first in area 62 which then gradually increases until also area 64 has been filled. This somewhat balanced increase in pressure is favorable for two reasons: on the one hand, it makes possible to reduce pressure slightly before the actual filling has taken place, in order to prevent an abrupt pressure peak when the filling process is completed. On the other hand, the risk of cracks in the muffle due to a pressure surge towards the end of the filling process is reduced, such that the end of the filling process is balanced.

Figure 8:
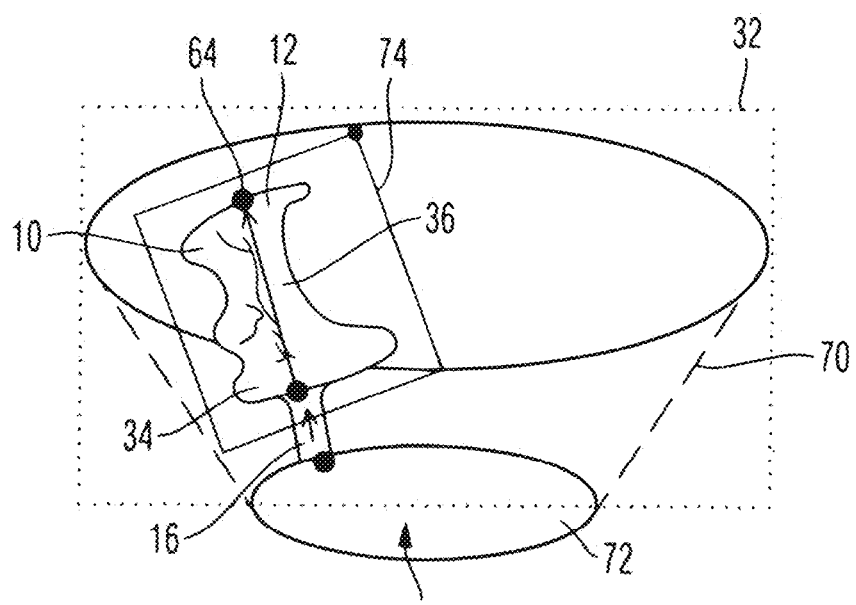
FIG. 8 is a schematic depiction of the alignment of another positive model and additionally its position in virtual space.

From FIG. 8, it can be taken in what fashion another dental restoration 12 can extend in space. A tapered isothermal corridor 70 is depicted schematically, within which the multitude of dental restorations 12, one of which is depicted in FIG. 8, extend. Front surface 22 is adjacent to lower end 72 of corridor 70, and the upper end is formed by the upper end of virtual space 32.

Around each dental restoration 12 there extends an envelope space 74 which serves for the purpose of keeping the distance and prevents dental restoration 12 from being pressed too close to neighboring dental restorations. This is depicted schematically as a rectangle in FIG. 8, in practice however, the smallest possible space which keeps a distance of 3 mm or 2 mm to dental restoration 12.

As can be taken from FIG. 8 with positive model 10 provided in the form of an inlay there, docking site 34 is attached in the upper third at the thickest position of the inlay. Axis 36 is positioned, maximizing length L, in elongation of an axis of conveyor 16 which is not depicted here. The flow direction of the front of dental ceramic material generally extends centrally of the central fissure.

From FIG. 9, a corresponding alignment of a side tooth crown 49 applying three coordinate systems can be taken by way of example.

Based on muffle arbor 18 which forms the base of the first coordinate system, an isothermal corridor is calculated by the mold, as a trajectory path, along which dental restorations 12 are supposed to extend. At the same time, the possible arrangements of the dental restorations are restricted by virtual space 32.

Starting from muffle arbor 18, conveyor channels 16 extend at an angle of 45° to 60° to the horizontal since an annular heating is employed here.

The third coordinate system is spanned over envelope space 74 of crown 49, which is again depicted as a rectangle here, but in fact is an envelope of the dental restoration.

Flow direction L of the dental ceramic material through the cavities created by positive model 10 is in elongation of the axes of conveyor channels 16, however inclined at an angle of 12° compared with these.

At the bridge, the abutment is done in a basically known fashion at the incisal surfaces, which is again at the thickest position of each crown that forms docking site 34.

In the exemplary embodiment depicted, the length of conveyor channels 16 amounts to about half of length L of virtual axis 36. It is to be understood that this value can be widely adapted to the requirements and tends to be slightly larger with smaller dental restorations and slightly smaller with larger ones.

EXEMPLARY EMBODIMENTS

Example 1

A process for manufacturing a dental restoration:
in which, based on a scanning result of a mouth situation with the help of a CAD software, a dental restoration (12) is designed and is produced as a positive model (10) in a shaping step in a material that is removable without leaving residues, such as wax or polyacrylics, by means of removing or in an additive fashion, for instance by means of rapid prototyping,
which positive model (10) is demolded and removed with the help of a muffle in a basically known fashion, and which muffle is provided with a pressing channel (20) which is connected via a conveyor channel (16) with a cavity for the dental restoration (12) corresponding to the positive model (10),
wherein the blank inserted into the pressing channel (20) is heated and is subjected to pressure, such that it is deformed and dental material for shaping the dental restoration (12) flows into the cavity through the conveyor channel (16) and fills the former, characterized in that
in the shaping step or subsequent to that, based on the dimensions of the muffle in relation to the size and shape of the positive model (10) or the positive models (10), at least one conveyor channel (16) is automatically produced for each positive model (10) with the help of a module of the CAD software,
wherein the module defines a virtual inside space within the muffle for arrangement of the dental restoration (12) inside that,
wherein the conveyor channel (16) extends at an angle (30) of between 0° and 130°, in relation to the axis (14, 24) of the pressing channel (20) in an inclined fashion away from that, in particular essentially along an isotherm inside the muffle, and
wherein the position with the largest wall thickness of the positive model (10) is selected as a docking site (34), and the module positions the positive model (10) in relation to the conveyor channel (16) in such a fashion that it extends in elongation of the axis (14, 24) of the conveyor channel (16) and the length of the virtual axis (14, 24) through the positive model (10) is maximized.

Example 2

The process in accordance with Example 1, characterized in that the module determines, based on the shape of the dental restoration (12) and thus of the positive model (10), starting from the thickest position, i.e. the position with the largest wall thickness of that, a primary flow direction for the dental material as being that direction in which the cross-section of the flow in a pre-determined distance from the thickest position is largest, and that the longest virtual axis (36) through the positive model (10) in elongation of the conveyor channel axis in accordance with Example 1, however deviating in the direction of the primary flow direction, is determined.

Example 3

The process in accordance with one of the preceding Examples, characterized in that the alignment of the dental restoration (12) itself and thus of the positive model (10) itself within the muffle are determined by the module in such a fashion that their largest longitudinal extension essentially extends along an isotherm.

Example 4

The process in accordance with one of the preceding Examples, characterized in that if a number of dental restorations (12) are manufactured at the same time, those are positioned essentially along the envelope curve of a cone or taper and equally spread around the pressing channel (20) which essentially terminates at the peak of that cone or taper.

Example 5

The process in accordance with one of the preceding Examples, characterized in that the conveyor channels are provided with radii (42, 44) and/or constant transitions both on the input side, i.e. in the direction towards the pressing channel (20), and on the output side, i.e. in the direction towards the dental restoration (12).

Example 6

The process in accordance with one of the preceding Examples, characterized in that the conveyor channel (16) which is determined by the module determines the alignment of the dental restoration (12) with the help of its axis (14, 24) elongated by the dental restoration (12), and that the alignment of the dental restoration (12) is selected such that the penetration length of the elongated conveyor channel (16) through the dental restoration (12) is maximized.

Example 7

The process in accordance with one of the preceding Examples, characterized in that the dental restoration (12) is formed as a crown or a bridge (49) and the basal area of the crown (49) extends in elongation of a pressing channel axis (24) with its open side away from the pressing channel (20).

Example 8

The process in accordance with one of Examples 5 or 6, characterized in that the dental restoration (12) is formed as a prefacette or a veneer and the basal area of the prefacette or the veneer extends in such a fashion that it points radially outwards in relation to a pressing channel axis (24).

Example 9

The process in accordance with one of the preceding Examples, characterized in that the alignment of the dental restoration (12) with respect to the conveyor channel axis is selected such that the elongation of the conveyor channel axis through the dental restoration (12) extends through the center of mass of the dental restoration (12) if the conveyor channel axis is positioned at the thickest position of the dental restoration (12).

Example 10

The process in accordance with one of the preceding Examples, characterized in that the module connects the conveyor channel (16), in relation to the outside surfaces of the dental restoration (12), in an eccentric or off-center fashion, in particular essentially in elongation of a labial or buccal surface.

Example 11

The process in accordance with one of the preceding Examples, characterized in that the length of the conveyor channel (16) is determined by the module depending on the size and the weight of the dental restoration (12), in particular with larger dental restorations (12), such as molars, crowns (49) or front-teeth crowns for the upper jaw with a length of 30% to 50% of the length of the main extensional direction of the dental restoration (12), and with smaller dental restorations (12), such as front-teeth crowns for the lower jaw with a length of 40% to 65% of the length of the main extensional direction of the dental restorations (12).

Example 12

The process in accordance with one of the preceding Examples, characterized in that, if a number of dental restorations (12) are arranged in one muffle, the module determines the conveyor channels to those in such a fashion that the dental restorations (12) are arranged at regular intervals, which is within an isothermal corridor, and if imaginary connecting lines are created, span between these a polyhedron approximating a taper or cone.

Example 13

The process in accordance with one of the preceding Examples, characterized in that the module accesses a conveyor channel library which indicates different profile designs, lengths, docking points and angles (30) of conveyor channels based on sizes and types of dental restorations (12), and that the module, based on these values, determines or suggests the conveyor channels with regards to their lengths, their diameters and their angles (30).

Example 14

The process in accordance with one of the preceding Examples, characterized in that the virtual inside space for the provision of the positioning of the dental restoration (12) within the muffle is dependent on the size of the muffle and releases a placing space of the dental restoration (12) within the muffle in such a fashion that the dental restoration (12) keeps a distance from the muffle of at least 2 mm, in particular of 10 mm, with respect to the outside wall of the muffle and the height of the virtual inside space is lower in a radially inwardly direction than in a radially outwardly direction.

Example 15

The process in accordance with one of the preceding Examples, characterized in that the positive model (10) is manufactured with the help of a milling process and the milling blank is formed as a cylinder with a cylinder height corresponding to the virtual space (32) of between 15 mm and 50 mm, in particular about 40 mm.

Example 16

The process in accordance with one of the preceding Examples, characterized in that at least one conveyor channel (16) is formed as a dummy channel (40), i.e. without a dental restoration (12).

Example 17

The process in accordance with one of the preceding Examples, characterized in that the length and thickness of each conveyor channel (16) relative to the other conveyor channels is set in such a fashion that it is adapted to the volume of its associated dental restoration (12), which is in such a fashion that during pressing the complete filling of the dental restoration (12) is done at the same time, i.e. that conveyor channels for larger dental restorations (12) are set for a lower flow resistance, and conveyor channels for smaller dental restorations (12) are set for a larger flow resistance, and that in particular each of the flow resistances of the conveyor channels is selected such that it is proportional to the weight of the associated dental restorations (12).

Example 18

A dental ceramics production device, with a CAD/CAM device for providing a pressing mold for manufacturing a dental ceramics, wherein a CAD software of this, based on a scanning result of a mouth situation, determines the shape of the dental restoration (12), and wherein a CAM device of this determines the configuration of the dental restoration (12) with the help of an expendable muffle, characterized in that the CAD software is provided with a module which automatically determines the arrangement of the angle and the dimensions of a conveyor channel (16) between a central pressing channel (20) and a cavity for shaping the dental restoration (12) inside a virtual inside space within the muffle and determines the work angle of the dental restoration (12) in relation to the conveyor channel axis of the associated conveyor channel (16) at a docking site (34) of the dental restoration (12) at the conveyor channel (16), which has been selected at the thickest position of the dental restoration (12), in such a fashion that the elongation of the conveyor channel axis extends through the largest possible length of the dental restoration (12) starting from the thickest position, in particular based on a pre-set library of shapes of dental restorations (12) and/or conveyor channels.

Example 19

The dental ceramics production device in accordance with Example 18, characterized in that the docking site (34) of the dental restoration (12) at the conveyor channel (16) is selected by the module at the position at which a ball with the largest possible diameter fits into the dental restoration (12), wherein the elongation of the axis (14, 24) of the conveyor channel (16) extends in particular essentially through the center of this ball.

Example 20

The dental ceramics production device in accordance with one of Examples 18 or 19, characterized in that each dental restoration (12) is determined by the module in the virtual space (32) with regards to its arrangement and alignment in such a fashion that it has a marginal distance both from the outside wall of the muffle and from the neighboring dental restoration (12) which does not exceed a pre-determined value which in particular amounts to several millimeters.

Example 21

The dental ceramics production device in accordance with one of Examples 18 to 20, characterized in that the docking site (34) of the dental restoration (12) at the conveyor channel (16) in the vertical projection—in relation to the muffle—is selected in such a fashion that a narrow position of the dental restoration (12) is arranged radially inwards, i.e. adjacent to the pressing channel (20), and a wider position further outside radially, principally similar to a cake.

Example 22

The dental ceramics production device in accordance with one of Examples 18 to 21, characterized in that the conveyor channel (16) and/or the dental restoration (12) is provided with a code or an identification at a basal or at least a covered position, which facilitates the association with the order concerned and/or the patient concerned.

Example 23

The dental ceramics production device in accordance with one of Examples 18 to 22, characterized in that the dental restoration (12) is provided with a constant and layer-by-layer construction which is suitable for stereolithography, in particular with an envelope curve whose slope is always larger than or equal zero over its entire extension, observed each starting from docking site (34) of the dental restoration (12) concerned in the lateral view of that, or observed in the direction of the pressing channel axis.

Example 24

The dental ceramics production device in accordance with one of the preceding Examples, characterized in that the CAM device uses as the zero position of the virtual inside space the front surface (22) of the pressing channel (20) and polymerizes a conveyor channel base directly to that front surface (22) away from which the conveyors channels extend.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for manufacturing a dental restoration for a patient comprising:
    designing a dental restoration based on a scan of the patient's mouth, using a CAD software module;
    producing a positive model of the dental restoration using a material that is removable from a mold without leaving a residue;
    producing, using the CAD software module, at least one conveyor channel for the positive model based on the dimensions of a muffle in relation to the size and shape of the positive model, wherein the conveyor channel is determined by defining a space within the muffle for arrangement of the dental restoration;
    removing the positive model, wherein the muffle has a pressing channel which is connected via a conveyor channel with a cavity for the dental restoration corresponding to the positive model;
    inserting a blank of dental material into the pressing channel; and
    heating and applying pressure to the blank such that the blank is deformed and dental material for shaping the dental restoration flows through the conveyor channel and fills the cavity;
    wherein the conveyor channel extends at an angle of between 0° and 130° away from an axis of the pressing channel, the axis being located essentially along an isotherm inside the muffle; and
    wherein a docking site is selected based on a position with the greatest wall thickness of the positive model, and the CAD software module positions the positive model in relation to the conveyor channel to elongate the axis of the conveyor channel and that the length of a virtual axis through the positive model is maximized.

2. The method of claim 1, wherein the CAD software module determines, based on the shape of the positive model, starting from the position with the greatest wall thickness of the positive model, a primary flow direction for the dental material in which the cross-section of the flow in a pre-determined distance from the thickest position is greatest, and that the maximized virtual axis through the positive model deviates in the primary flow direction.

3. The method of claim 1, wherein the arrangement of the positive model within the muffle is determined by the CAD software module in such a fashion that the greatest longitudinal extension of the dental restoration extends essentially along an isotherm.

4. The method of claim 1, further comprising manufacturing a plurality of dental restorations at the same time, the plurality of dental restorations being located essentially along an envelope curve of a cone or taper and equally spread around the pressing channel which terminates essentially at the peak of the cone or taper.

5. The method of claim 1, wherein the conveyor channel is provided with radii and/or constant transitions in the direction towards the pressing channel, and in the direction towards the positive model.

6. The method of claim 1, wherein the conveyor channel determines an alignment of the dental restoration, and the alignment of the dental restoration is determined such that the axis a of the conveyor channel through the dental restoration is maximized.

7. The method of claim 1, wherein the dental restoration is formed as a crown or a bridge and a basal area of the crown extends in elongation of a pressing channel axis with an open side away from the pressing channel.

8. The method of claim 5, wherein the dental restoration is formed as a prefacette or a veneer and a basal area of the prefacette or the veneer is located radially outwards in relation to a pressing channel axis.

9. The method of claim 1, wherein an alignment of the dental restoration with respect to the conveyor channel axis is selected such that the elongation of the conveyor channel axis through the dental restoration extends through the center of mass of the dental restoration when the conveyor channel axis is positioned at the thickest position of the dental restoration.

10. The method of claim 1, where the CAD software module connects the conveyor channel, in relation to the outside surfaces of the dental restoration, in an eccentric or off-center fashion.

11. The method of claim 1, wherein the length of the conveyor channel is determined by the CAD software module depending on the size and the weight of the dental restoration.

12. The method of claim 1, further comprising manufacturing wherein if a plurality of dental restorations are arranged in one muffle, the CAD software module determines the conveyor channels to the dental restorations such that the dental restorations are arranged at regular intervals within an isothermal corridor such that the arrangement of dental restorations approximates a taper or cone.

13. The method of claim 1, wherein the CAD software module accesses a conveyor channel library which indicates different profile designs, lengths, docking points and angles of conveyor channels based on sizes and types of dental restorations, and that the CAD software module, based on a size and type of the dental restoration, determines or suggests the conveyor channels with regards to lengths, diameters, and angles of the conveyor channels.

14. The method of claim 1, wherein the space is dependent on the size of the muffle and a placing space of the dental restoration within the muffle is such that the height of the space is lower in a radially inward direction relative to the axis of the pressing channel than in a radially outward direction.

15. The method of claim 1, wherein the positive model is manufactured by a milling process and a milling blank is formed as a cylinder with a cylinder height corresponding to the space of between 15 mm and 50 mm.

16. The method of claim 1, wherein at least one additional conveyor channel is formed as a dummy channel without an associated dental restoration.

17. The method of claim 1, wherein the length and thickness of each conveyor channel relative to the other conveyor channels is selected such that the conveyor channel is adapted to the volume of the associated dental restoration.

* * * * *